(12) United States Patent
Haltiner, Jr. et al.

(10) Patent No.: US 9,666,880 B2
(45) Date of Patent: May 30, 2017

(54) INTERCONNECT FOR FUEL CELL STACK

(71) Applicant: DELPHI TECHNOLOGIES, INC., Troy, MI (US)

(72) Inventors: Karl J. Haltiner, Jr., Fairport, NY (US); Charles J. Badura, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 494 days.

(21) Appl. No.: 14/105,487

(22) Filed: Dec. 13, 2013

(65) Prior Publication Data
US 2015/0171435 A1    Jun. 18, 2015

(51) Int. Cl.
*H01M 8/02* (2016.01)
*H01M 8/0206* (2016.01)
*H01M 8/2425* (2016.01)
*H01M 8/026* (2016.01)
*H01M 8/0273* (2016.01)
*H01M 8/124* (2016.01)

(52) U.S. Cl.
CPC ......... *H01M 8/0206* (2013.01); *H01M 8/026* (2013.01); *H01M 8/2425* (2013.01); *H01M 8/0273* (2013.01); *H01M 2008/1293* (2013.01)

(58) Field of Classification Search
CPC ............. H01M 8/0232; H01M 8/0206; H01M 8/2425; H01M 8/026; H01M 2008/1293; H01M 8/0273
See application file for complete search history.

(56) References Cited

U.S. PATENT DOCUMENTS

| | | | |
|---|---|---|---|
| 2005/0164071 A1* | 7/2005 | Horiguchi | H01M 8/0228 429/450 |
| 2005/0181264 A1* | 8/2005 | Gu | C22C 29/00 429/414 |
| 2005/0221138 A1* | 10/2005 | Chinchure | H01M 8/0232 429/458 |
| 2010/0239940 A1* | 9/2010 | Bourgeois | H01M 8/0282 429/468 |

* cited by examiner

*Primary Examiner* — Ula C Ruddock
*Assistant Examiner* — Lisa S Park
(74) *Attorney, Agent, or Firm* — Joshua M. Haines

(57) ABSTRACT

A metal interconnect for a fuel cell stack is formed from an electrically conductive metal sheet having at least four stamped slots through the metal sheet, and often many more than four slots. The stamped slots individually extend lengthwise parallel to the direction of fluid flow during operation of the fuel cell stack assembly and are disposed on the metal sheet in a pattern extending parallel and perpendicular to the direction of fluid flow, so as to define at least one metal strip portion between adjacent slots extending parallel to the direction of fluid flow and at least one metal strip portion between adjacent slots extending perpendicular to the direction of fluid flow. The metal strip portion(s) include portions of reduced thickness that allow for fluid flow between adjacent slots and portions of greater thickness that provide discrete locations of electrical connection between the separator plate fuel cell electrode.

14 Claims, 4 Drawing Sheets

INTERCONNECT FOR FUEL CELL STACK

RELATIONSHIP TO GOVERNMENT CONTRACTS

This invention was made with Government support under DE-NT003894 or DE-FC26-02NT41246 awarded by DOE. The Government has certain rights in this invention.

BACKGROUND OF THE INVENTION

In practical fuel cell systems, the output of a single fuel cell is typically less than one volt, so connecting multiple cells in series is required to achieve useful operating voltages. Typically, a plurality of fuel cell stages, each stage comprising a single fuel cell unit, are mechanically stacked up in a "stack" and are electrically connected in series electric flow from the anode of one cell to the cathode of an adjacent cell via intermediate stack elements known in the art as interconnects and separator plates.

A solid oxide fuel cell (SOFC) comprises a cathode layer, an electrolyte layer formed of a solid oxide bonded to the cathode layer, and an anode layer bonded to the electrolyte layer on a side opposite from the cathode layer. In use of the cell, air is passed over the surface of the cathode layer, and oxygen from the air migrates through the electrolyte layer and reacts in the anode with hydrogen being passed over the anode surface, forming water and thereby creating an electrical potential between the anode and the cathode of about 1 volt. Typically, each individual fuel cell is mounted, for handling, protection, and assembly into a stack, within a metal frame referred to in the art as a "picture frame", to form a "cell-picture frame assembly".

To facilitate formation of a prior art stack of fuel cell stages wherein the voltage formed is a function of the number of fuel cells in the stack, connected in series, a known intermediate process for forming an individual fuel cell stage joins together a cell-picture frame assembly with an anode interconnect and a metal separator plate to form an intermediate structure known in the art as a fuel cell cassette ("cassette"). The thin sheet metal separator plate is stamped and formed to provide, when joined to the mating cell frame and anode spacers, a flow space for the anode gas. Typically, the separator plate is formed of ferritic stainless steel for low cost. In forming the stack, the cell-picture frame assembly of each cassette is sealed to the perimeter of the metal separator plate of the adjacent cassette to form a cathode air flow space and to seal the feed and exhaust passages for air and hydrogen against cross-leaking or leaking to the outside of the stack.

The separator plate provides for fluid flow separation between the anode and cathode of adjacent cells in the fuel cell stack, and also provides part of an electrically conductive path connecting the anode from one cell in series with the cathode of an adjacent cell. In some fuel cell stack designs, the separator plate itself is configured on one or both sides to provide a three-dimensional structure that provides contact with the electrode of an adjacent fuel cell at a number of locations so that electrical connectivity, with spaces between the points of contact so that fluid (air or fuel) can flow along the surface of the electrode. In other designs, a separate interconnect structure is disposed in the stack between separator plate and the adjacent fuel cell(s).

To optimize the robustness of the electrical contact to the anode or cathode of a fuel cell, an interconnect should contact the cell surfaces at many locations as possible to minimize electrical resistance, and the points should be close together to minimize current path length and variations in current density that can lead to parasitic electrical losses. In addition, and largely in conflict with the requirement for numerous closely-spaced points of electrical contact, the interconnect should provide a flow path for air or fuel with as much exposure to the cell surfaces as possible for efficient cell operation. It is also desirable to minimize flow restrictions to reduce pumping losses in the fuel cell system that can lower power output and operating efficiency, while at the same time minimizing the interconnect height to provide compactness to the fuel cell. It is also desirable to provide the interconnect with a robust structure that is stiff in the direction perpendicular to the cell surface in order to minimize dimensional changes (creep) of the fuel cell stack structure due to the high operating temperature, as well as provide for efficient and reproducible manufacturing processes at low cost.

Various types of structures have been disclosed as fuel cell interconnects. Woven wire meshes have been proposed, but are relatively expensive, have high flow restriction and point contact to the cell surfaces, making effective electrical contact difficult and have poor dimensional stability. Sheet metal with formed dimples or ridges have also been disclosed. Although such structures can be formed inexpensively into the separator sheet itself, often eliminating the need for one or both of the separate interconnect structures, they have poor physical integrity, with low strength in the direction perpendicular to the cell surface, resulting in creep that leads to loss of electrical contact over time. Thick sheet metal plates with machined features have also been proposed, but the spacing of the electrical contacts is often greater than desired or covers too much surface area due to limitations of machining. These effects can be minimized with more finely detailed machining, but this can drive the cost up considerably and also can compromise tool strength. Alternatively these thick structures can be formed without machining from multiple essentially 2-dimensional pieces that are stacked and brazed together, but this also drives up manufacturing costs considerably.

Accordingly, it would be desirable to provide new alternatives for fuel cell interconnects.

SUMMARY OF THE INVENTION

The present invention provides a planar fuel cell stack assembly comprising a plurality of fuel cells including an interconnect module disposed between adjacent fuel cells. The interconnect module comprises an electrically conductive separator plate disposed between and electrically connected to an anode of a first of said adjacent fuel cells and a cathode of a second of said adjacent fuel cells The separator plate is electrically connected at discrete locations along an interface between the separator plate and each of the first fuel cell anode and the second fuel cell cathode such that during operation of the fuel cell stack assembly, fluid can flow along the surface of each of the first fuel cell anode and the second fuel cell anode between the discrete locations of electrical connection. A first electrically conductive metal interconnect is disposed between the separator plate and one of the first fuel cell anode and the second fuel cell cathode. This interconnect comprises an electrically conductive metal sheet having at least four stamped slots through the metal sheet, and often many more than four slots. The stamped slots individually extend lengthwise parallel to the direction of fluid flow during operation of the fuel cell stack assembly and are disposed on the metal sheet in a pattern extending parallel and perpendicular to the direction of fluid flow, so as to define at least one metal strip portion between adjacent slots extending parallel to the direction of fluid flow and at least one metal strip portion between adjacent slots extending perpendicular to the direction of fluid flow. The parallel and perpendicular metal strip portions include portions of reduced thickness that allow for fluid flow between adjacent slots and portions having a greater thickness than the portions of reduced thickness that provide discrete locations of electrical connection between the separator plate and the first fuel cell anode or the second fuel cell cathode.

In another aspect of the invention, a method of making a fuel cell interconnect comprises stamping at least four slots through a metal sheet, the stamped slots individually extending lengthwise parallel to a direction along an axis of the metal sheet and disposed on the metal sheet in a pattern extending parallel and perpendicular to the axis, so as to define at least one metal strip portion between adjacent slots extending parallel to the axis of the metal sheet and at least one metal strip portion between adjacent slots extending perpendicular to the axis of the metal sheet. The method further comprises coining portions of reduced thickness along the at least one metal parallel strip portion and along the at least one metal strip portion that extends perpendicular to the axis of the metal sheet.

In yet another aspect of the invention, an interconnect for a fuel cell stack is provided, comprising an electrically conductive metal sheet having at least four stamped slots through the metal sheet, the stamped slots individually extending lengthwise parallel to an axis of the metal sheet and disposed on said metal sheet in a pattern extending parallel and perpendicular to the axis, so as to define at least one metal strip portion between adjacent slots extending parallel to the direction of the axis and at least one metal strip portion between adjacent slots extending perpendicular to the direction of the axis. The parallel and perpendicular metal strip portions include portions of reduced thickness and portions having a greater thickness than the portions of reduced thickness.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments, without limiting same. Where practical, reference numbers for like components are commonly used among multiple figures.

Figure 1:
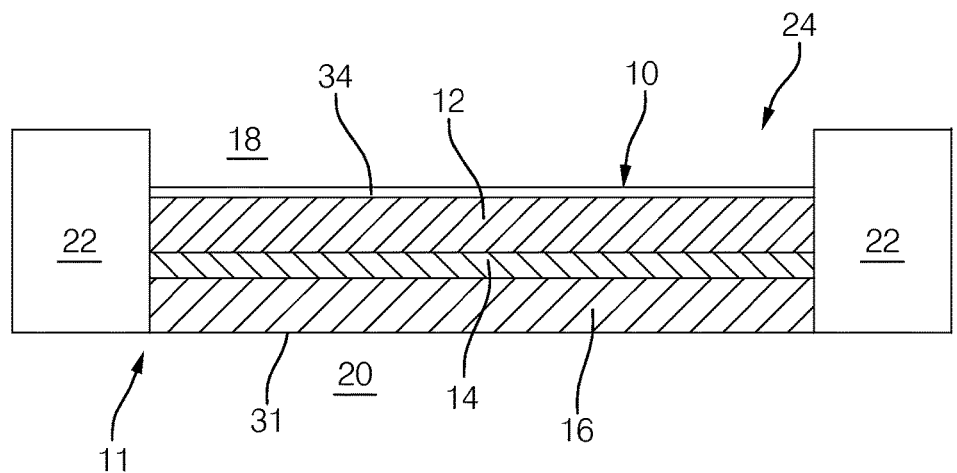
FIG. 1 is a schematic drawing of an SOFC mounted in a frame.
Figure 3:
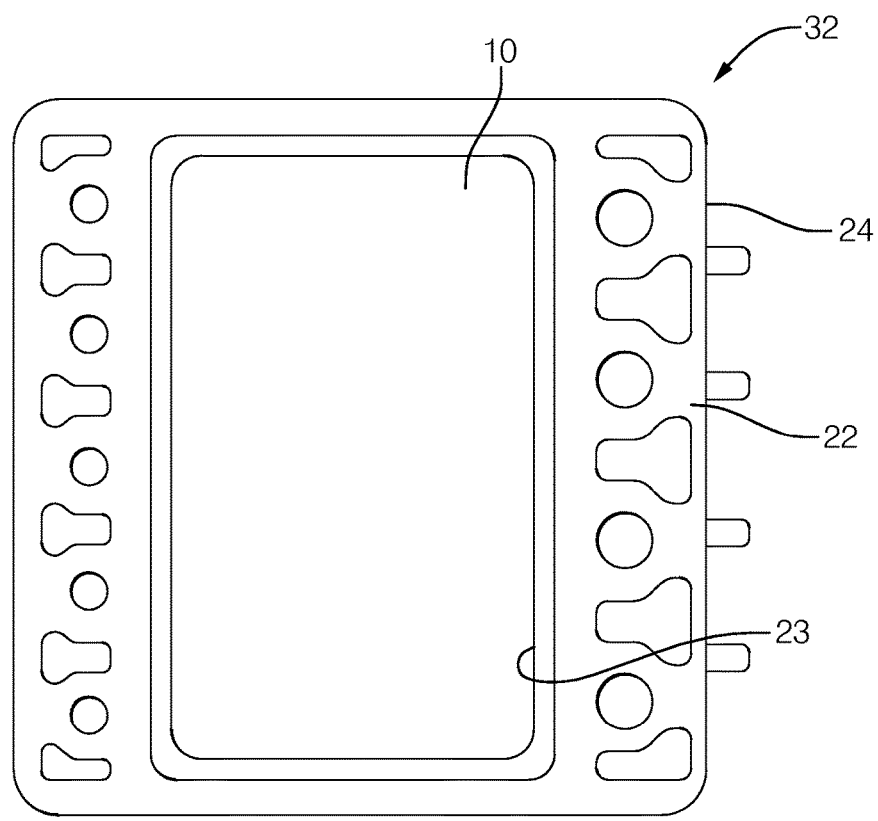
FIG. 3 is a plan view of a functional fuel cell cassette.
Figure 2:
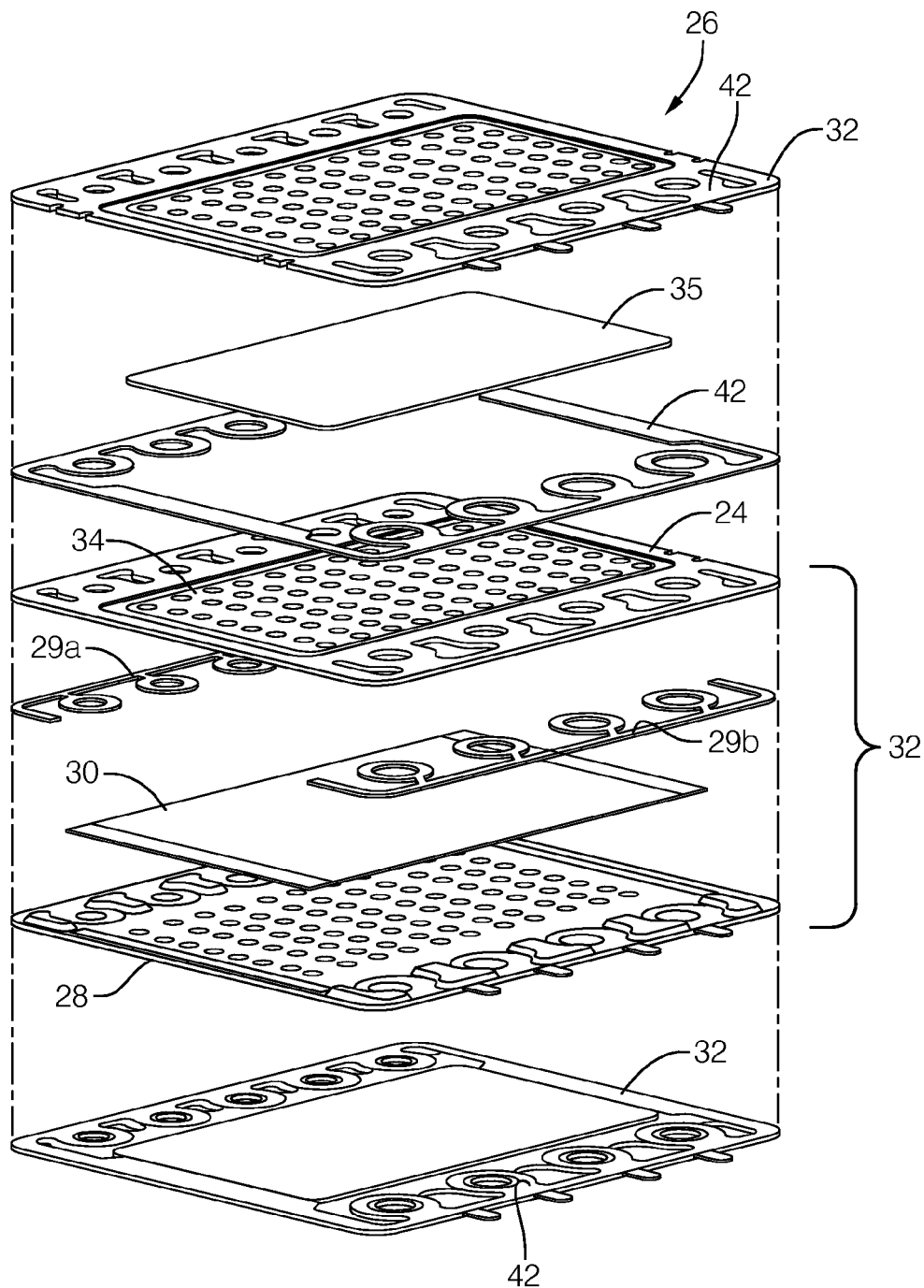
FIG. 2 is an exploded isometric drawing of a portion of a fuel cell stack employing a plurality of single-cell cassettes.

Referring to FIGS. 1 through 3, an exemplary functional SOFC fuel cell module 10 comprises an electrode 11 including cathode layer 12, an electrolyte layer 14 formed of a solid oxide and bonded to the cathode layer 12, and an anode layer 16 bonded to the electrolyte layer 14 on a side opposite from the cathode layer. Air 18 is passed over the surface 34 of the cathode layer 12, and oxygen from the air migrates through the electrolyte layer 14 and reacts in the anode layer 16 with hydrogen anode gas 20 being passed over the anode surface 31 to form water, thereby creating an electrical potential between the anode and the cathode of about 1 volt. Each individual fuel cell module 10 is mounted, for handling; protection, and assembly into a stack, within a metal frame 22 referred to in the art as a "picture frame", the frame having a central opening or "window" 23, to form a "cell-picture frame assembly" 24.

To facilitate formation of a stack 26 of individual fuel cells connected in series wherein the voltage formed is a function of the number of individual fuel cell modules in the stack, an intermediate process joins together each cell-picture frame assembly 24 with a separator plate 28 and a first solid (anode) interconnect 30 to form an intermediate structure known as a fuel cell cassette 32. The thin sheet metal separator plate 28 is stamped and formed to provide, when joined to the mating cell frame 22 and inlet and outlet anode spacers 29a, 29b, a flow space for the anode gas 20. Preferably, the separator plate 28 is formed of ferritic stainless steel for low cost. Anode interconnect 30 is placed between the separator plate 28 and the anode surface 31 of the cell within the cassette 32.

A second (cathode) interconnect 35, installed during final assembly against cathode surface 34, provides a cathode air flow space. During the final prior art stack assembly process, a glass perimeter seal 42 is disposed between adjacent cassettes 32, and the stack under pressure is brought to operating temperature and allowed to settle to its final form. The glass sinters, and the separator plate and cell frame may deform slightly, providing a compliant assembly, until the cells and interconnects are resting on one another, under load, which prevents further motion.

Figure 4:
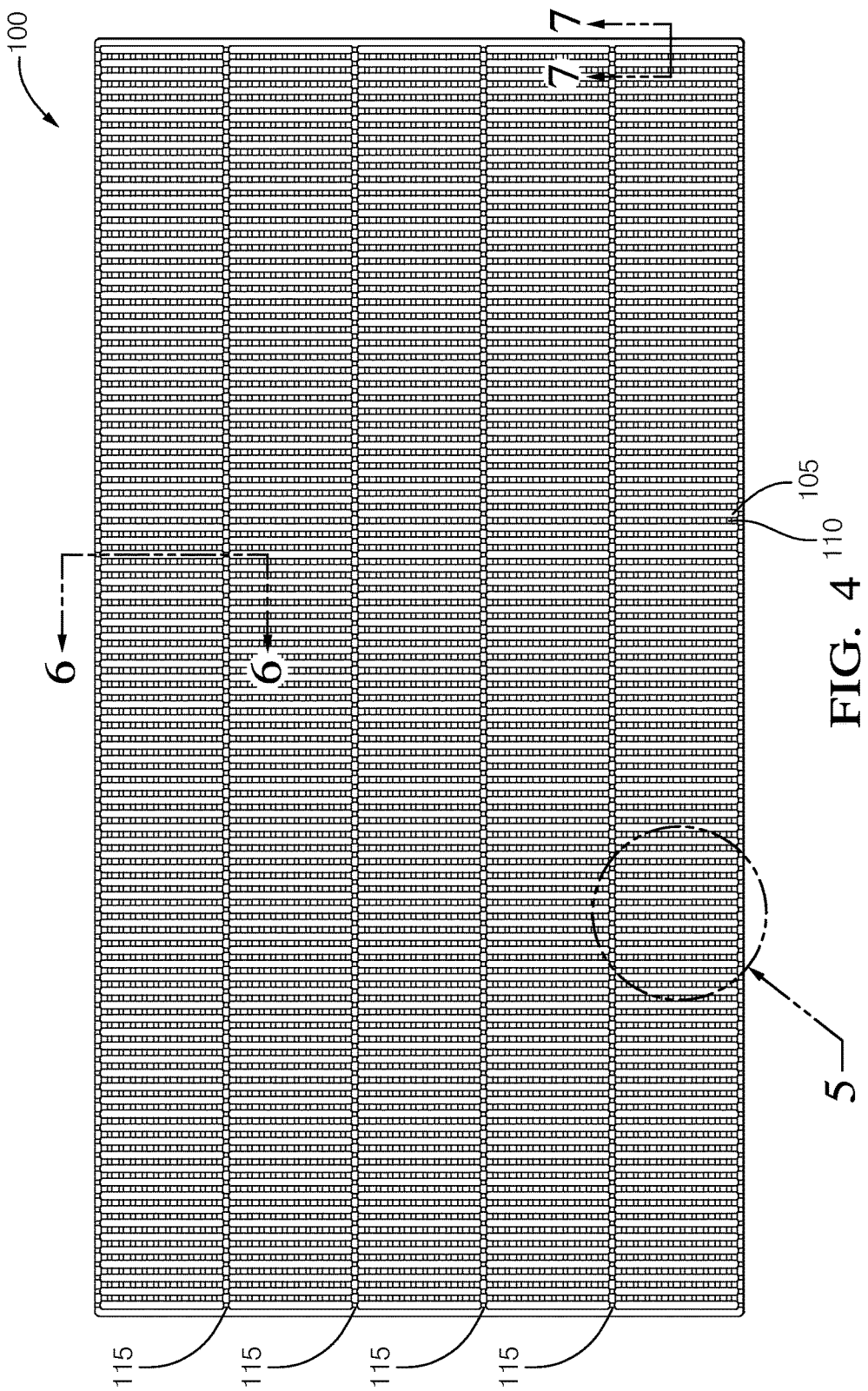
FIG. 4 is a drawing of an interconnect in accordance with the present invention.
Figure 5:
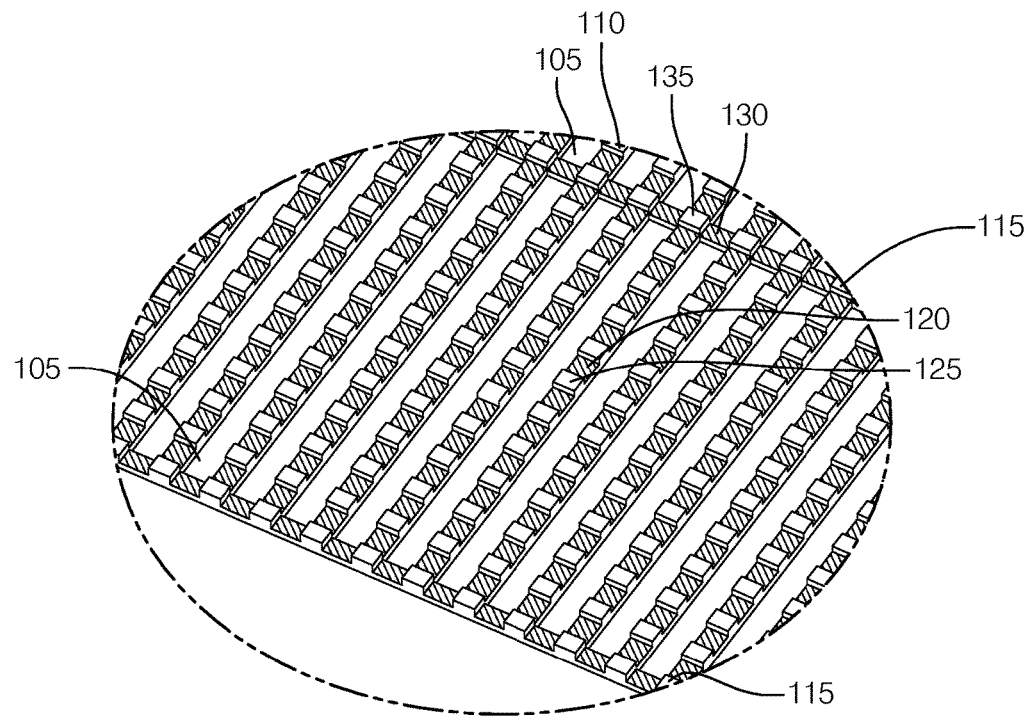
FIG. 5 is an exploded detail view of a portion 5 of FIG. 4.
Figure 6:
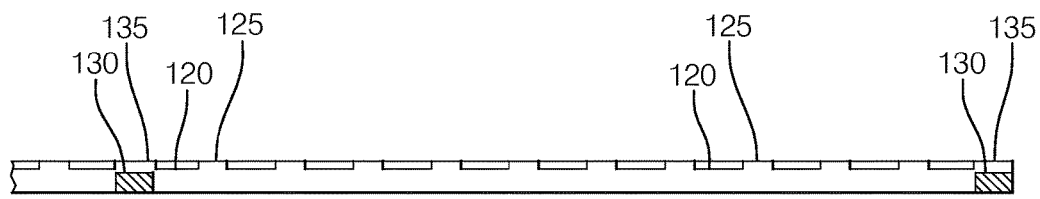
FIG. 6 is an exploded cross-sectional view taken along portion 6-6 of FIG. 4.
Figure 7:
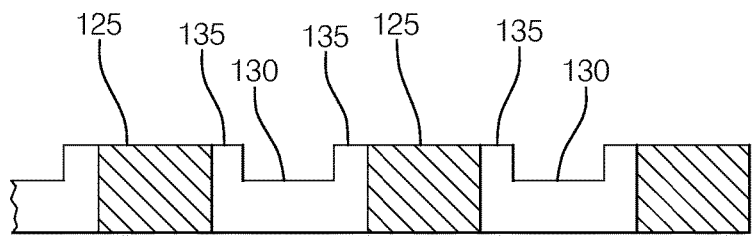
FIG. 7 is an exploded cross-sectional view taken along portion 7-7 of FIG. 4.

Referring now to FIGS. 4-7, a fuel cell interconnect 100, which can be employed as anode interconnect 30 and/or as cathode interconnect 35, is depicted in FIG. 4. FIG. 5 is an exploded view of section B of the interconnect 100. FIG. 6 is an exploded cross-sectional view taken along section C-C of the interconnect 100. FIG. 7 is an exploded cross-sectional view taken along section D-D of the interconnect 100. Not all elements of FIG. 4 are labeled there due to the scale of the figure, and are instead depicted in one or more of FIGS. 5-7. As shown in FIGS. 4-7, interconnect 100 has a number of vertically-extending slots 105, with the vertical direction being the direction of fluid flow during operation of the fuel cell. The slots 105 are disposed in a pattern extending both vertically and horizontally, which defines both vertical strip portions 110 and horizontal strip portions 115. The vertical strip portions 110 have portions of reduced thickness 120 and portions of unreduced thickness 125. The horizontal strip portions 115 have portions of reduced thickness 130 and portions of unreduced thickness 135. The portions of reduced thickness 120, 130 are depicted with shading in FIG. 5. In that particular configuration, no shaded portions are shown positioned at the intersection of a horizontal strip and a vertical strip, i.e., where the reduced portion could be characterized as on either the horizontal or vertical strip. However, such embodiments, while not shown, are explicitly embraced as within the scope of the invention. Furthermore, it should be noted that the use of the term "unreduced" does not mean that the so-identified portions have not been subjected to any reduction in thickness whatsoever. In some embodiments, of course, the unreduced portions 125, 135 have not been subjected to any thickness-reducing process after the sheet metal was initially milled. In other embodiments, the unreduced portions may be subjected to thickness-reducing process such as coining, rolling, grinding, etc. provided that the thickness of the unreduced portions 125, 135 is greater than the thickness of the reduced portions 120, 130, respectively. Rather, the term means that the 'unreduced' portions have not been subjected to the same degree of thickness reduction as the reduced portions.

The slots 105 can be formed by metal stamping techniques, using blanking techniques to cut the slots through the steel sheet, followed by a coining operation to form the portions of reduced thickness 120 and 130. These operations can be effectively performed at multiple stations on a single stamping press. Stamping operations can be conducted at relatively low cost in high volumes. The slots 105 are sized to provide low flow restriction, but do not run uninterrupted across the full vertical length of the interconnect 100 as that would make the part dimensionally unstable. The spaces between adjacent ends of the vertically extending slots 105 forms the horizontal strip portions 115, which serves as a supporting cross-rib structure for the interconnect 100.

To prevent the cross-ribs from interrupting fluid flow, flow passages are provided by coining portions of reduced thickness 130. Normally, coined features in metal sheets tend to be very shallow because there is nowhere for the metal to be displaced to during the coining operation, and such shallowness would limit their effectiveness as flow passages. However, the openings provided by the slots 105, which are formed before coining, provide space for metal displaced during coining, so that the coining can provide sufficient thickness reduction to provide robust flow passages. In some embodiments, the depth of the coined passage comprises from 30-70% of the thickness of the overall part (i.e., the unreduced thickness). The portions of unreduced thickness 125, 135 provide a solid, essentially incompressible, metal connection between the fuel cell and the separator plate (and between adjacent fuel cells if the interconnect 100 is used on both the anode and cathode sides of the separator plate), providing dimensional stability to the fuel cell stack. In embodiments where the portions of unreduced thickness 125 and 135 have not been subject to stamping, the original uniform thickness of the metal sheet is maintained in these portions to provide uniform and consistent contact for electrical connectivity with the fuel cell electrode.

The coined passages are more restrictive to flow than the slots, but the distance between slots is maintained at a relatively short distance, e.g., 0.5 mm to 3.0 mm, so that pressure drop through the passage is maintained at acceptable levels. In fact, since the coined passages account for 70-90% of the total pressure drop, the depth and size of the coined passages can be tuned (i.e., adjusted in the design) to achieve a desired pressure drop for cell-to-cell uniform flow distribution and minimal part-to-part variation. The horizontal strip portions 115 have portions of reduced thickness 130 and portions of unreduced thickness 135. The portions of reduced thickness 130 minimize the surface area of the fuel cell covered by the interconnect and allow fuel or air to have access to the surface of the fuel cell. In addition, the reduced thickness portions 130 help to provide pressure equalization between the slots 105 perpendicular to the flow direction so that flow is uniform and balanced across the width of the fuel cell (perpendicular to flow). Clearly, the number and surface area footprint of the coined portions of reduced thickness can be adjusted to meet the demands of the particular fuel cell design, but generally sufficient coined portions of reduced thickness are provided so that 10-20% of the surface area of the fuel cell is covered by the interconnect. In other words, the slots and portions of reduced thickness account for 80-90% of the surface area of the interconnect 100, but the unreduced areas are spaced close enough to help reduce electrical losses.

The terms "front", "back", "bottom", "top", "above", "below", "over", "under", "horizontal", "vertical", and are used herein, unless otherwise noted, merely for convenience of description, and are not limited to any one position or spatial orientation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A planar fuel cell stack assembly comprising a plurality of fuel cells including an interconnect module disposed between adjacent fuel cells, said interconnect module comprising:

an electrically conductive separator plate disposed between and electrically connected to an anode of a first of said adjacent fuel cells and a cathode of a second of said adjacent fuel cells, said electrical connections being at discrete locations along an interface between the separator plate and each of the first fuel cell anode and the second fuel cell cathode such that during operation of the fuel cell stack assembly, fluid can flow along the surface of each of the first fuel cell anode and the second fuel cell anode between said discrete locations of electrical connection; and a first electrically conductive metal interconnect disposed between the separator plate and one of the first fuel cell anode and the second fuel cell cathode, comprising an electrically conductive metal sheet having at least four stamped slots through the metal sheet, said stamped slots individually extending lengthwise parallel to the direction of fluid flow during operation of the fuel cell stack assembly and disposed on said metal sheet in a pattern extending parallel and perpendicular to the direction of fluid flow, so as to define at least one metal strip portion between adjacent slots extending parallel to the direction of fluid flow and at least one metal strip portion between adjacent slots extending perpendicular to the direction of fluid flow, said parallel and perpendicular metal strip portions including portions of reduced thickness that allow for fluid flow between adjacent slots and portions having a greater thickness than the portions of reduced thickness that provide discrete locations of electrical connection between the separator plate and the first fuel cell anode or the second fuel cell cathode, wherein first sides of said parallel and perpendicular metal strip portions are in a common plane and wherein second sides of said parallel and perpendicular metal strip portions opposing said first sides includes said portions having reduced thickness and said portions having greater thickness.

2. The fuel cell stack assembly of claim 1, wherein said reduced thickness portions of the first metal interconnect are the result of metal coining to which the portions having a greater thickness than the portions of reduced thickness have not been subjected.

3. The fuel cell stack assembly of claim 1, wherein the metal strip of the first metal interconnect extending parallel to the direction of fluid flow has a width of from 0.5 mm to 3.0 mm.

4. The fuel cell stack assembly of claim 1, wherein the entirety of the metal strip extending perpendicular to the direction of fluid flow is of reduced thickness.

5. The fuel cell stack assembly of claim 1, wherein the first metal interconnect comprises a plurality of metal strips extending parallel to the direction of fluid flow, and a plurality of metal strips extending perpendicular to the direction of fluid flow.

6. The fuel cell stack assembly of claim 5, wherein the portions having greater thickness than the reduced portions are in contact with 10% to 20% of the surface area of the first fuel cell anode or the second fuel cell cathode.

7. The fuel cell stack assembly of claim 1, further comprising a second electrically conductive metal interconnect disposed between the separator plate and the other of the first fuel cell anode and the second fuel cell cathode, comprising an electrically conductive metal sheet having at least four stamped slots through the metal sheet, said stamped slots individually extending lengthwise parallel to the direction of fluid flow during operation of the fuel cell stack assembly and disposed on said metal sheet in a pattern extending parallel and perpendicular to the direction of fluid flow, so as to define at least one metal strip portion between adjacent slots extending parallel to the direction of fluid flow and at least one metal strip portion between adjacent slots extending perpendicular to the direction of fluid flow, said parallel and perpendicular metal strip portions including portions of reduced thickness that allow for fluid flow between adjacent slots and portions having a greater thickness than the portions of reduced thickness that provide discrete locations of electrical connection between the separator plate and the first fuel cell anode or the second fuel cell cathode.

8. The fuel cell stack assembly of claim 7, wherein said reduced thickness portions of the second metal interconnect are the result of metal coining to which the portions having a greater thickness than the portions of reduced thickness have not been subjected.

9. The fuel cell stack assembly of claim 7, wherein the metal strip of the second metal interconnect extending parallel to the direction of fluid flow has a width of from 0.5 mm to 3.0 mm.

10. The fuel cell stack assembly of claim 7, wherein the second metal interconnect comprises a plurality of metal strips extending parallel to the direction of fluid flow, and a plurality of metal strips extending perpendicular to the direction of fluid flow.

11. The fuel cell stack assembly of claim 10, wherein the portions having greater thickness than the reduced portions of the second metal interconnect are in contact with 10% to 20% of the surface area of the first fuel cell anode or the second fuel cell cathode.

12. An interconnect for a fuel cell stack, comprising an electrically conductive metal sheet having at least four stamped slots through the metal sheet, said stamped slots individually extending lengthwise parallel to an axis of the metal sheet and disposed on said metal sheet in a pattern extending parallel and perpendicular to the axis, so as to define at least one metal strip portion between adjacent slots extending parallel to the direction of the axis and at least one metal strip portion between adjacent slots extending perpendicular to the direction of the axis, said parallel and perpendicular metal strip portions including portions of reduced thickness and portions having a greater thickness than the portions of reduced thickness, wherein first sides of said parallel and perpendicular metal strip portions are in a common plane and wherein second sides of said parallel and perpendicular metal strip portions opposing said first sides includes said portions having reduced thickness and said portions having greater thickness.

13. The interconnect of claim 12, wherein said reduced thickness portions of the second metal interconnect are the result of metal coining to which the portions having a greater thickness than the portions of reduced thickness have not been subjected.

14. The interconnect of claim 12, wherein at least one metal strip extending parallel to said axis of the metal sheet has a width of from 0.5 mm to 3.0 mm, and/or the portions of portions having greater thickness than the reduced portions comprise 10% to 20% of the surface area of the metal sheet.

* * * * *